United States Patent
Magnusson, Jr. et al.

(10) Patent No.: US 11,012,532 B2
(45) Date of Patent: May 18, 2021

(54) CONTENT BLOCKER DETECTION AND CIRCUMVENTION

(71) Applicant: Sourcepoint Technologies Inc., New York, NY (US)

(72) Inventors: Geir Magnusson, Jr., Wilton, CT (US); Joseph Mifsud, Seattle, WA (US); Dmitri Rabinowitz, New York, NY (US); Chase Cundiff, Seattle, WA (US); Max Newbould, Seattle, WA (US)

(73) Assignee: Sourcepoint USA, Inc., New York, NY (US)

(*) Notice: Subject to any disclaimer, the term of this patent is extended or adjusted under 35 U.S.C. 154(b) by 510 days.

(21) Appl. No.: 15/453,366

(22) Filed: Mar. 8, 2017

(65) Prior Publication Data

US 2017/0264712 A1 Sep. 14, 2017

Related U.S. Application Data

(60) Provisional application No. 62/305,685, filed on Mar. 9, 2016.

(51) Int. Cl.
*G06F 15/16* (2006.01)
*H04L 29/08* (2006.01)
*G06Q 30/02* (2012.01)
*H04L 9/06* (2006.01)

(52) U.S. Cl.
CPC ....... *H04L 67/327* (2013.01); *G06Q 30/0276* (2013.01); *G06Q 30/0277* (2013.01); *H04L 67/02* (2013.01); *H04L 67/146* (2013.01); *H04L 67/2823* (2013.01); *H04L 9/0618* (2013.01); *H04L 2209/76* (2013.01)

(58) Field of Classification Search
None
See application file for complete search history.

(56) References Cited

U.S. PATENT DOCUMENTS

| | | | | |
|---|---|---|---|---|
| 7,818,764 | B2* | 10/2010 | Matz | H04N 7/163 |
| | | | | 725/34 |
| 8,356,352 | B1* | 1/2013 | Wawda | G06F 21/566 |
| | | | | 726/22 |
| 9,992,259 | B2* | 6/2018 | Lind | H04L 67/2895 |
| 2004/0024641 | A1* | 2/2004 | Cartwright | G06Q 30/02 |
| | | | | 705/14.66 |

(Continued)

OTHER PUBLICATIONS

International Search Reporting and Written Opinion of the International Searching Authority, issued in PCT/IB2017/000274, dated Jun. 12, 2017 (11 pages).

(Continued)

*Primary Examiner* — Phuoc H Nguyen
(74) *Attorney, Agent, or Firm* — Goodwin Procter LLP

(57) ABSTRACT

Methods and systems for circumventing content blocking systems are disclosed. Example implementations include detecting the presence of an existing blocker that disrupts a first content-type and circumventing the blocker, such that a circumvented first content-type is presented to a user. The method can also include determining that the blocker has adjusted to block the circumvented content, in which case, the method can include disrupting presentation of a second content-type.

13 Claims, 3 Drawing Sheets

(56) References Cited

U.S. PATENT DOCUMENTS

| | | | | |
|---|---|---|---|---|
| 2005/0044185 A1* | 2/2005 | Hind | ............... | H04L 29/06 709/219 |
| 2009/0222510 A1* | 9/2009 | van Riel | ............... | G06Q 30/02 709/203 |
| 2009/0254424 A1* | 10/2009 | Swanson | ............... | G06Q 30/02 705/14.53 |
| 2010/0077095 A1* | 3/2010 | Wong | ............... | G06Q 30/02 709/231 |
| 2011/0064383 A1* | 3/2011 | Bauchot | ............... | G06Q 30/02 386/248 |
| 2012/0101907 A1* | 4/2012 | Dodda | ............... | G06Q 30/0277 705/14.73 |
| 2014/0325665 A1* | 10/2014 | Duca | ............... | G06F 21/57 726/26 |
| 2016/0140626 A1* | 5/2016 | Agarwal | ............... | G06Q 30/0276 715/234 |

OTHER PUBLICATIONS

"Adblocker blockers move to a whole new level" by Paul Ducklin, dated May 18, 2017 http://nakedscurity.sophos.com/2016/02/01/adblocker-blockers-move-to-a-whole-new-level/ (18 pages).

* cited by examiner

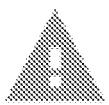 AD BLOCKER INTERFERENCE DETECTED

Your ad blocker is interfering with the operation of this site. Please disable it or whitelist this site. Thank you.

Ein Adblocker unterbindet die Funktionsfähigkeit dieser Seite. Bitte deinstallieren Sie den Adblocker oder setzen Sie diese Seite auf die Whitelist. Vielen Dank.

Votre adblocker empêche le bon fonctionnement de ce site. Veuillez le désactiver ou placer ce site en liste blanche. Merci.

您的广告屏蔽软件影响了网站的正常运行。请您将其关闭或者将本网站加入白名单。谢谢。

Su bloqueador está interfiriendo con el funcionamiento de este sitio. Favor de desactivarlo o agregar este sitio a la lista de sitios de confianza. Gracias.

広告ブロック機能が有効化されているためこのサイトを表示できません。お手数ですが機能を解除して下さい。ありがとうございます。

Seu adblocker está interferindo na operação deste site. Por favor, desabilite o adblocker ou então coloque este site na whitelist do seu adblocker. Obrigado Virk sía hjá þér hindrar eðlilega virkni þessarar síðu. Vinsamlegast slökktu á síunni eða bættu þessari síðu inn í undantekningarlista. Takk fyrir.

FIG. 2

CONTENT BLOCKER DETECTION AND CIRCUMVENTION

CROSS-REFERENCE TO RELATED APPLICATIONS

This application claims priority to and the benefit of U.S. Provisional Patent Application No. 62/305,685, filed on Mar. 9, 2016, titled "Content Blocker Detection and Circumvention," the contents of which are incorporated by reference herein in their entirety.

TECHNICAL FIELD

The present disclosure relates generally to the field of website content presentation, and in particular to systems and methods for circumventing systems designed to block the presentation of certain website content.

BACKGROUND

Non-primary website content presentation is an important component of the business of many content producing internet companies (sometimes referred to in this application as "publishers"). The revenue earned from companies who pay to have their content displayed on an internet company's website provides a significant (and in many cases, the sole) source of income that allows such businesses to operate. Typically the non-primary content is displayed in designated portions of webpages (e.g., headers, side banners, or integrated within scrollable content lists) alongside the primary content produced by the website. In some instances, a webpage will include particular slots designated for non-primary content. The code generated to display the website to a viewer may: (i) send a request to a server to provide a URL for non-primary content that meets certain criteria (sometimes referred to as a "call") and (ii) display the non-primary content (defined by the URL) in a non-primary content slot.

Some website viewers prefer that the non-primary content not be displayed. An industry has emerged to service these preferences. In particular, website viewers can now download/use content blocking software designed to prevent non-primary content from being displayed. In some instances, the content blocking software prevents (e.g., blocks) URLs deemed to be non-primary content from being uploaded by the webpage. The content blocking software may determine which URLs to block by using a set of rules based on characteristics or patterns that are common of advertisement URLs.

Though viewers may be pleased with the short term results of content blocking software, its effects are harmful to many publishers. Publishers are often only paid if the non-primary content is actually displayed to viewers on their webpage. If the non-primary content is blocked, the publishers do not get paid, which has a significant impact on their ability to generate revenue and stay in business. Should the harmful effects become pronounced enough, the publishers may be forced to shut down, which is ultimately harmful to the viewers, as well.

As such, there is a significant need for systems and methods capable of circumventing the content blocking software such that the blocked content can continue to be presented to a viewer. Moreover, content blocking software providers are savvy such that they will often detect techniques for circumventing their software and design new rules to address the techniques. As such, there is a particular need for systems and methods capable of circumventing blocking software even after they have been detected by the content blocking software providers.

SUMMARY

In general, one aspect of the subject matter disclosed in this specification can be embodied in methods that include the actions of detecting the presence of a blocker adapted to disrupt presentation of a first content-type to a user, circumventing the blocker such that the first content-type is presented to the user, determining whether presentation of the circumvented first content-type is being interfered with, and if presentation of the circumvented first content-type is being interfered with, disrupting presentation of a second content-type not adapted to be disrupted by the blocker. Other embodiments of this aspect include corresponding systems, apparatus, and computer programs.

These and other aspects can optionally include one or more of the following features. The first content-type can include an advertisement. The user can be a viewer of a website. In some instances, the circumventing step includes ciphering a URL associated with the first content-type and, in some cases, can include routing the ciphered URL through a proxy-server. The determining step may include determining at least one of: (i) whether a URL associated with the circumvented first content-type is blocked, (ii) whether an iframe associated with the circumvented first content-type is created, (iii) whether the iframe can run a script, and (iv) whether the iframe can add an image. In certain implementations, the second content-type comprises primary content. Disrupting presentation of the second content-type can include at least one of: (i) redirecting the user to a separate webpage (which, in some cases, may include a message informing the user that the blocker has interfered with presentation of the second content-type), (ii) displaying a message requesting that the user disable the blocker, and (iii) altering a style of presentation of the second content-type.

BRIEF DESCRIPTION OF THE DRAWINGS

FIG. 2 is an example message that can be displayed to a user redirected to a separate website.

FIG. 3 is a flow chart showing an example method for determining whether presentation of circumvented content is being interfered with.

DESCRIPTION

Figure 1:
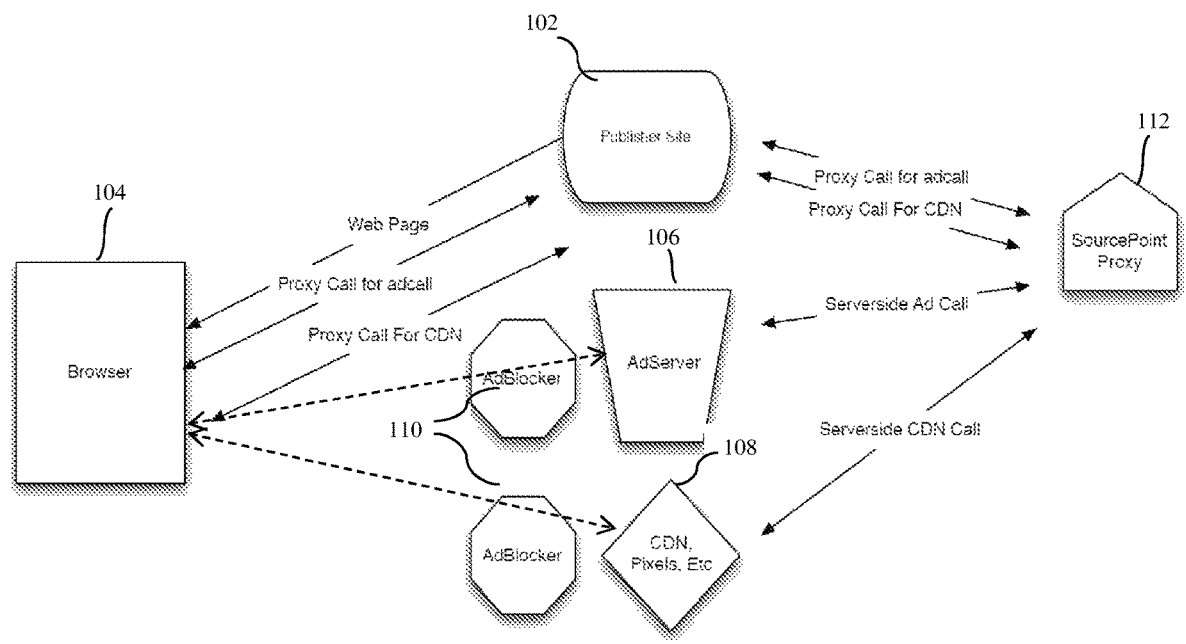
FIG. 1 illustrates an example network system architecture within which implementations of the methods described in the present disclosure can be performed.

Implementations of this disclosure relate to improved systems and methods for circumventing ad blockers, content blockers, and other mechanisms that can interfere with the content on a webpage (collectively referred to herein as "ACBAOMs"). As depicted schematically in FIG. 1, webpages are typically transferred from a publisher 102 to a browser 104. The content of the webpage usually includes certain content desired by consumers that drives traffic to the webpage (referred to herein as "primary content"). For example, the primary content on cnn.com can be the news articles featured on the webpage; the primary content on youtube.com can be the streaming videos, etc. If the webpage includes a slot for an advertisement or other non-primary content, the browser 104 may send a request (e.g., ad call) to either an ad server 106 or other content delivery network 108 ("CDN"). The ad server 106 or CDN 108 can then respond by sending content back to the server responsive to the request (illustrated with dashed lines in FIG. 1). The advertisements and other content provided by ad servers 106 and other CDNs 108 are often URL based objects. For readability, this application will often refer simply to an ad server 106 and/or advertisements, but in any such instance, this disclosure covers similar concepts with the ad server 106 replaced by a CDN 108 and the advertisement replaced by any other type of content.

Many current ACBAOMs 110 operate by preventing the transfer of advertisements and other content from ad servers 106 and CDNs 108 to the browser 104. For example, in some cases, ACBAOMs 110 block calls from the browser 104 for URLs from certain domains and/or that feature characteristics or patterns common to advertisements or other non-primary content. In other cases, ACBAOMs 110 block the effects of such URLs; for example, by disallowing the URL to return a script, create an iframe, create an image, and other similar functions that allow the advertisement or other non-primary content to be presented properly to a viewer.

In various implementations, the method for circumventing ACBAOMs described herein includes detecting the presence of an existing ACBAOM 110 in the first instance. In general, any known technique for detecting the presence of an ACBAOM 110 can be used; for example, determining that calls from the browser 104 to particular domains (e.g., ad servers) are being blocked. Many other techniques are possible.

In some instances, the method can include initially circumventing the existing ACBAOM 110. In some cases, the initial circumvention step only occurs once an ACBAOM 110 is detected. In other cases, the initial circumvention step occurs regardless of whether an ACBAOM 110 is detected. In general, the initial circumvention of an existing ACBAOM 110 can be done using a wide variety of strategies and techniques. One example technique is described below.

In general websites use a SaaS program (e.g., Google's Doubleclick for Publishers (DFP)) to manage, select and deliver advertisements. The program typically includes a client-side library (e.g., Google Publisher Tags (GPT)) loaded onto the browser 104 which is able to make ad calls to a corresponding ad server 106 and fill ad slots on the publisher's webpage with the results returned therefrom. The example circumvention technique can include creating a proxy server 112 and loading the client-side library via the proxy server 112. The proxy server 112 can then rewrite parts of the library such that when ad calls are made, instead of being directed to the ad server 106 (which will be blocked by the ACBAOM 110), they are ciphered and directed to the proxy server 112 (in some cases, through the publisher server 102). Upon receipt, the proxy server 112 can uncipher the call, and direct the call to the ad server 106, which returns an appropriate result (e.g., ad content) to the proxy server 112. The transfer of ad content from the ad server 106 to the proxy server 112 is not blocked because it is a server-to-server transfer which bypasses the existing ACBAOM 110 interacting with the browser 104. The proxy server 112 can then rewrite the returned content so that it will not be blocked by the existing ACBAOM 110. For example, consider a situation in which the returned content is defined by the following html code:

```
<html>
<a href="http://advertisencom/clickURL">
<img src="http://advertiser.com/imagejpg"/>
</a>
</html>
```

In this situation, if this content were delivered to the browser 104 it would likely be blocked by the existing ACBAOM 110 (e.g., based on its domain name). For example, the click URL would be blocked such that the advertisement could not be clicked on, and the image URL would be blocked such that it could not load. To prevent this from happening, the proxy server 112 can rewrite the code such that it is not blocked. For example, the proxy server could rewrite the above html code as follows:

```
<html>
<a href="http://www.publisher.com/abc?r=CIPHERED_CLICK_URL">
<img src="http://www.publisher.com/abc?r=CIPHERED_IMAGE_URL"/>
</a>
</html>
```

The rewritten content can then be delivered from the proxy server 112 to the browser 104 (in some cases through the publisher server 102). Taking the example shown above, when the browser 104 attempts to render the content, instead of rendering a URL from a blocked domain (e.g., advertiser.com), it renders a URL from the publisher's domain (e.g., publisher.com). The rewritten content can include transformed URLs so that it can be recognized as such by the publisher 102 (e.g., "/abc" in the example above). The publisher 102 can have a rule that sends all URL requests featuring this path to the proxy server 112. Upon receipt of the URL request, the proxy server 112 can decipher the ciphered content. For example, CIPHERED_CLICK_URL can be deciphered to http://advertiser.com/clickURL and CIPHERED_IMAGE_URL can be deciphered to http://advertiser.com/image.jpg. The proxy server 112 can then fetch this content and send it to the browser (often through the publisher 102) such that it is presented properly to the viewer.

As stated above, the technique for circumventing an existing ACBAOM 110 described in detail above is a single example technique. In other implementations, other methods using different ciphering and re-routing techniques may be used. In still further implementations, methods using other techniques that do not include ciphering and/or re-routing may be used. Regardless of the technique used, content that circumvents an existing ACBAOM 110 is referred to in this application as "circumvented content."

Unfortunately circumventing an existing ACBAOM 110 is not a complete solution to the problems facing publishers and advertisers. As mentioned, ACBAOM providers/operators/developers are savvy to the fact that publishers and advertisers will attempt to circumvent their systems. As such, they have demonstrated an ability to identify when an existing system has been circumvented, and can create new rules that specifically target the circumvented content. For instance, taking the above example, once the existing ACBAOM 110 is circumvented, the ACBAOM providers can simply write a new rule blocking any URLs containing the "/abc" path. The systems and methods described herein can offer a more complete solution by preventing (or, at least, disincentivizing) the existing ACBAOM providers from taking such actions.

In various implementations, the methods described herein can include determining whether the presentation of the circumvented content is being interfered with. One obvious example is if the URL for the circumvented content (sometimes referred to in this application as a "recovery URL") is with presentation of the primary content (example shown in FIG. 2). An example line of javascript code that can be activated to accomplish the redirect (in this example to the location defined by the URL: http://dev-support.sourcepoint.com/misc/cc/index.html) is as follows:

```
window._sp_.config.content_control_callback = function( ) {
    window.location.href = 'http://dev-support.sourcepoint.com/misc/cc/index.html';
};
``` blocked from loading. But ACBAOMs can take a number of additional actions to target circumvented content. For example, the ACBAOM 110 can prevent the recovery URL from fetching certain specific kinds of resources, for example, javascript, HTML, CSS, etc. In addition, in some instances, the ACBAOM 110 may permit the recovery URL to fetch certain resources, but prevents those resources from operating properly. For example, an iframe for the circumvented content may not be able to be created, the iframe may not be able to run a script, the iframe may not be able to add an image, etc.

In order to make this determination, the disclosed methods can include running a series of tests once the circumvented content is delivered to ensure that is continues to be presented properly. These tests can be run concurrently with the page loading so as to not interfere with the viewer's experience of viewing the primary content. The tests can be complicated by the fact that advertising content can sometimes be inserted into webpages that use a Document Object Model (DOM) structure via iframe elements, which can include separate security protections enforced by the browser 104. In general, the tests can include any test that will enable a determination of whether the circumvented content is presented properly. A non-exhaustive list of example tests can include at least one of the following: (i) loading a test iframe using the recovery URL, (ii) determining whether the test iframe (or in some cases, a different non-test iframe) contains content, (iii) determining whether javascript is able to run in the test iframe (or a different non-test iframe), (iv) detecting whether the javascript necessary to create the test iframe (or a different non-test iframe) is present, (v) determining whether the test iframe (or a different non-test iframe) is able to create a proper image (e.g., determining if the image is located in the iframe, determining if the image has the proper height, width, size, etc.) Many other tests are possible. In some instances, for a variety of reasons, a particular test may fail. In such instances, the test can be repeated multiple times (e.g., 3) and its result will only be confirmed if the same result is returned a particular number of times (e.g., 2 out of 3).

If it is determined that the circumvented content is being interfered with, then the method can include disrupting the presentation of the primary content to the viewer (sometimes referred to in this application as "content control"). In general, the disrupting step can include taking any step that disrupts the viewer's experience and, in some instances, is selectable by the publisher 102. Having a mechanism in place to disrupt the presentation of the primary content to the viewer can be thought of as a "tripwire" which is "tripped" upon discovering that the circumvented content is being specifically targeted. In an example implementation, the disrupting step can include redirecting the viewer to a different website. In some cases, the different website can include a message (sometimes in multiple languages) informing the viewer that the ACBAOM 110 has interfered In other implementations, the disrupting step can include at least one of: (i) displaying a message to the viewer informing them that the ACBAOM 110 is running (and in some cases requesting that the ACBAOM 110 be disabled), (ii) deleting certain content from the webpage, (iii) altering the style that the website is presented in, etc. Many other examples of disrupting presentation of primary content are possible.

Figure 3:
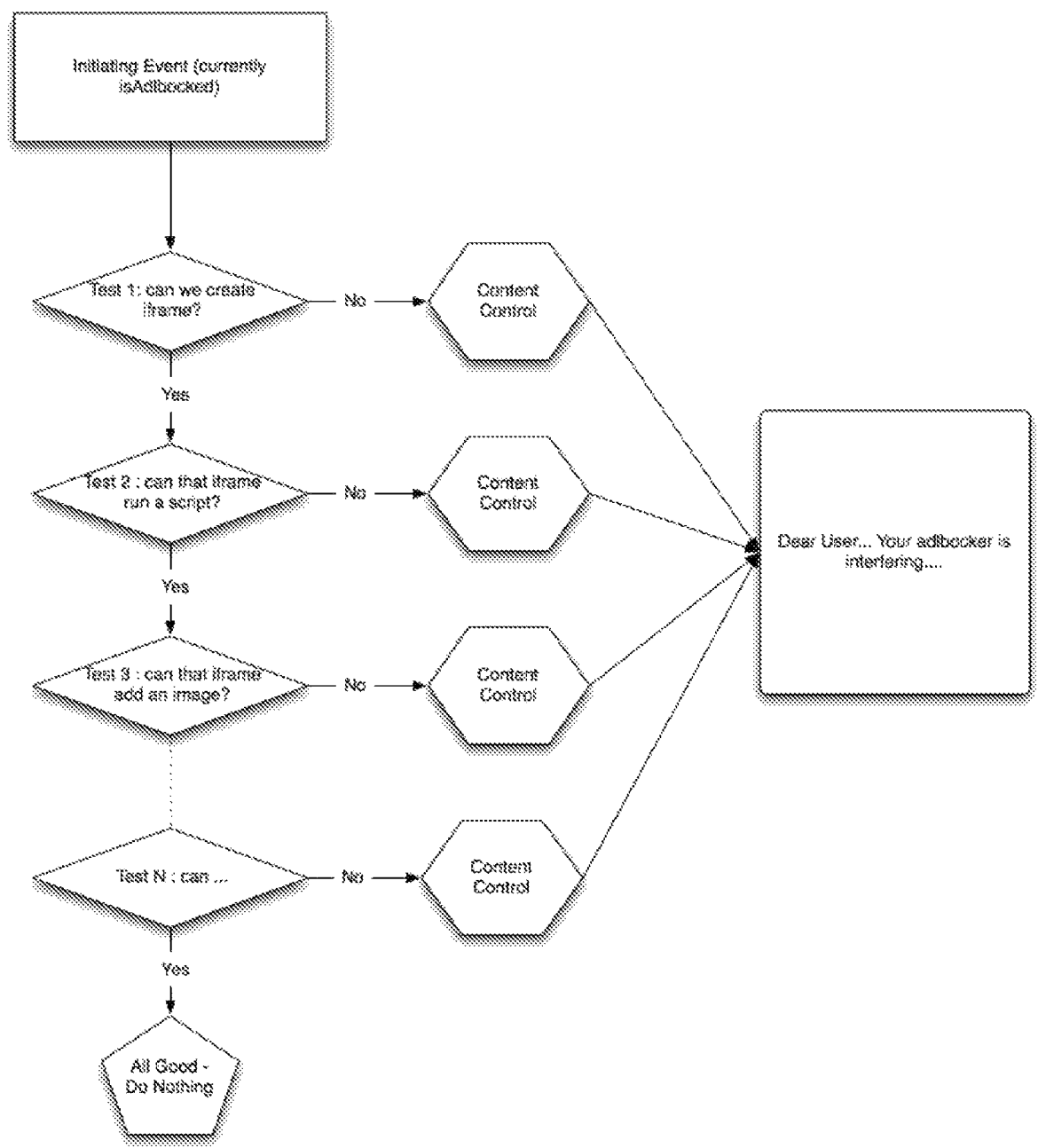

FIG. 3 is a flow chart showing an example method for performing the determining and disrupting steps described above. As shown, if it is determined that the circumvented content is not being interfered with, then "content control" is not triggered and the primary content continues to be displayed in an undisrupted manner. In addition, in various instances, steps can be taken to distinguish (i) interference with the circumvented content by an ACBAOM 110 from (ii) the circumvented content not being presented properly due to some other issue (e.g., network problems, human error, etc.) In the latter scenario ((ii)), the primary content may continue to be displayed in an undisrupted manner.

Disrupting the presentation of primary content to a user if circumvented content is interfered with (e.g., specifically targeted) by an ACBAOM 110 can be an effective technique to prevent such targeting. ACBAOM providers generally market themselves as helping the viewer to have a more enjoyable website viewing experience. If the presence of the ACBAOM 110 results in the disruption of presentation of the primary content, the ACBAOM 110 no longer fulfills its purpose (and actually detracts from it). It also presents a significant risk to the ACBAOM provider that the viewer will disable the ACBAOM 110 in order to view the primary content. As such, ACBAOM providers may refrain from interfering with the circumvented content (e.g., by developing new rules to specifically target it) and permit the circumvented content to be presented.

In order to perform the steps of determining whether circumvented content has been interfered with and, if so, disrupting presentation of the primary content, the publisher 102 may have additional code running on the webpage that performs these steps (referred to in this application as "recovery code"). In some situations, ACBAOMs can target recovery code itself and prevent it from running. There are several options for including the addition code such that it runs without being interfered with by an ACBAOM 110. In some instances, the code can be inlined with the webpage code itself. Thus, if the ACBAOM 110 prevents the recovery code from running, it will prevent the webpage (along with the primary content) from loading, as well. In other instances, the code can be included with other code needed from the site to function properly (e.g., javascripts that are critical/important to the viewer's experience). In still other instances, the publisher 102 can inline a small line of code (as one example, approximately 700 bytes in size) with the webpage code, the purpose of which is to load the recovery code. If the inlined code cannot load the recovery code, then content control measures (e.g., disrupting presentation of the primary code) can be triggered.

Operating Environment

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for presenting content to a user, the method comprising:
    detecting the presence of a blocker adapted to disrupt presentation of an advertising content to the user, wherein the advertising content is generated by a third party that is not the user by determining that a call from a browser for the advertising content has been blocked;
    circumventing the blocker by delivering a ciphered URL associated with the advertising content such that the advertising content is presented to the user;
    after circumventing the blocker, determining whether presentation of the circumvented advertising content is being interfered with by attempting to load an iframe using the ciphered URL and analyzing the results thereof; and
    if presentation of the circumvented advertising content is being interfered with, disrupting presentation of a primary content not adapted to be disrupted by the blocker by altering the user's visibility of the primary content.

2. The computer-implemented method of claim 1, wherein the user comprises a viewer of a website.

3. The computer-implemented method of claim 1, wherein the circumventing step further comprises routing the ciphered URL through a proxy server.

4. The computer-implemented method of claim 1, wherein analyzing the results of attempting to load the iframe comprises determining whether the iframe is created.

5. The computer-implemented method of claim 4, wherein analyzing the results of attempting to load the iframe further comprises determining at least one of (i) whether the iframe can run a script and (ii) whether the iframe can add an image.

6. The computer-implemented method of claim 1, wherein disrupting presentation of the primary content comprises redirecting the user to a separate webpage.

7. The computer-implemented method of claim 6, wherein the separate webpage comprises a message informing the user that the blocker has interfered with presentation of the primary content.

8. The computer-implemented method of claim 1, wherein disrupting presentation of the primary content comprises displaying a message requesting that the user disable the blocker.

9. The computer-implemented method of claim 1, wherein disrupting presentation of the primary content comprises altering a style of presentation of the primary content.

10. A system for presenting content to a user comprising:
    one or more data processing apparatus programmed to perform operations comprising:
        detecting the presence of a blocker adapted to disrupt presentation of an advertising content to the user by determining that a call from a browser for the advertising content has been blocked, wherein the advertising content is generated by a third party that is not the user;
        circumventing the blocker by delivering a ciphered URL associated with the advertising content such that the advertising content is presented to the user;
        after circumventing the blocker, determining whether presentation of the circumvented advertising content is being interfered with by attempting to load an iframe using the ciphered URL and analyzing the results thereof; and
        if presentation of the circumvented advertising content is being interfered with, disrupting presentation of a primary content not adapted to be disrupted by the blocker by altering the user's visibility of the primary content.

11. The system of claim 10, wherein analyzing the results of attempting to load the iframe comprises determining whether the iframe created.

12. The system of claim 11, wherein analyzing the results of attempting to load the iframe further comprises determining at least one of (i) whether the iframe can run a script and (ii) whether the iframe can add an image.

13. The system of claim 10, wherein disrupting presentation of the primary content comprises redirecting the user to a separate webpage.

\* \* \* \* \*